(12) United States Patent
Davis et al.

(10) Patent No.: US 9,596,962 B2
(45) Date of Patent: Mar. 21, 2017

(54) INFANT TOWEL DRYING MAT

(71) Applicants: Karin Lea Davis, Olympia, WA (US);
Regis U. Vu Quoc, Olympia, WA (US)

(72) Inventors: Karin Lea Davis, Olympia, WA (US);
Regis U. Vu Quoc, Olympia, WA (US)

(73) Assignee: Kaitlyn Elizabeth Vu Quoc, Olympia, WA (US)

( * ) Notice: Subject to any disclaimer, the term of this patent is extended or adjusted under 35 U.S.C. 154(b) by 166 days.

(21) Appl. No.: 14/693,474

(22) Filed: Apr. 22, 2015

(65) Prior Publication Data

US 2015/0313377 A1 Nov. 5, 2015

Related U.S. Application Data

(60) Provisional application No. 61/988,538, filed on May 5, 2014.

(51) Int. Cl.

| | |
|---|---|
| *A47K 3/12* | (2006.01) |
| *A47G 27/02* | (2006.01) |
| *A47D 15/00* | (2006.01) |
| *A01K 13/00* | (2006.01) |
| *A47D 13/08* | (2006.01) |
| *A47K 10/02* | (2006.01) |

(52) U.S. Cl.
CPC .............. *A47K 3/127* (2013.01); *A01K 13/00* (2013.01); *A01K 13/001* (2013.01); *A47D 13/08* (2013.01); *A47D 15/003* (2013.01); *A47G 27/0225* (2013.01); *A47K 3/12* (2013.01); *A47K 3/125* (2013.01); *A47K 10/025* (2013.01)

(58) Field of Classification Search
CPC ...... A47D 13/08; A47D 5/006; A47D 15/001; A47D 15/003; A47K 10/025; A47K 3/12; A47K 3/125; A47K 3/127; A01K 13/00; A01K 13/001; A47G 27/02; A47G 27/0212; A47G 27/0218; A47G 27/0225; A63B 21/4037
See application file for complete search history.

(56) References Cited

U.S. PATENT DOCUMENTS 2,052,973 A * 9/1936 Furtzaig ............. A41D 13/0556
182/230
2,140,902 A * 12/1938 Fischer .............. A47G 27/0406
4/581

(Continued)

*Primary Examiner* — David E Sosnowski
*Assistant Examiner* — David R Hare

(57) ABSTRACT

An infant towel drying mat that is intended to provide a convenient and effective apparatus to aid in the drying of a human infant or a pet animal. A drying mat has a first section, a second section, and a section hinge, wherein the first section and the second hinge are adjacently connected to the section hinge; the section hinge being positioned in between the first section and the second section and allows for multiple configurations of the infant towel drying mat. A plurality of connection tabs is adjacently connected to the drying mat and perimetrically positioned around the drying mat. Each of the plurality of connection tabs includes a protrusion connected to the drying mat, a surface fastener to be secured to a surface, and a press towel holder for mounting a towel. The surface fastener and the press towel holder are positioned opposite each other about the protrusion.

20 Claims, 15 Drawing Sheets

(56) References Cited

U.S. PATENT DOCUMENTS

| | | | | |
|---|---|---|---|---|
| 2,285,900 A * | 6/1942 | Chapman | A47K 3/127 | |
| | | | 297/229 | |
| 3,823,058 A * | 7/1974 | Yamaguchi | A47L 23/266 | |
| | | | 15/215 | |
| 3,995,331 A * | 12/1976 | Fotre | A47K 3/064 | |
| | | | 4/572.1 | |
| 4,937,897 A * | 7/1990 | Barnabie | A47K 3/002 | |
| | | | 297/187 | |
| 5,193,487 A * | 3/1993 | Vogel | A01K 13/001 | |
| | | | 119/671 | |
| 5,491,850 A * | 2/1996 | Kiester | A47K 3/127 | |
| | | | 4/572.1 | |
| 5,491,851 A * | 2/1996 | Alonso | A47C 27/001 | |
| | | | 5/420 | |
| D367,771 S * | 3/1996 | Julian | 5/655 | |
| 5,551,101 A * | 9/1996 | Leach | A47K 3/002 | |
| | | | 4/571.1 | |
| 5,987,677 A * | 11/1999 | Betker | A47D 5/003 | |
| | | | 5/655 | |
| 6,125,487 A * | 10/2000 | Ive | A47D 15/008 | |
| | | | 5/603 | |
| 6,272,704 B1 * | 8/2001 | Cutler | A47D 15/003 | |
| | | | 5/420 | |
| 6,298,509 B1 * | 10/2001 | Vickers | A47D 5/006 | |
| | | | 5/655 | |
| 6,507,959 B1 * | 1/2003 | Sundberg | A47K 3/024 | |
| | | | 4/572.1 | |
| 6,802,281 B2 * | 10/2004 | Otsuji | A01K 1/0157 | |
| | | | 119/168 | |
| 6,854,803 B2 * | 2/2005 | Tomas | A47C 16/04 | |
| | | | 297/118 | |
| 6,918,147 B2 * | 7/2005 | Stackman | A47D 15/003 | |
| | | | 4/551 | |
| 7,261,361 B1 * | 8/2007 | Simons | B60R 13/011 | |
| | | | 296/97.23 | |
| 7,500,278 B2 * | 3/2009 | Leach | A47D 5/006 | |
| | | | 5/424 | |
| 7,618,055 B2 * | 11/2009 | Chuah | A47D 5/006 | |
| | | | 280/47.41 | |
| 7,735,170 B1 * | 6/2010 | Emerson | A47D 5/006 | |
| | | | 5/603 | |
| 8,151,389 B1 * | 4/2012 | Lando | A47D 5/006 | |
| | | | 5/655 | |
| 8,291,526 B2 * | 10/2012 | Parvizian | A47C 16/02 | |
| | | | 297/423.1 | |
| D674,642 S * | 1/2013 | Richardson | D6/601 | |
| 9,032,572 B1 * | 5/2015 | Leach | A47D 15/003 | |
| | | | 5/655 | |
| D762,399 S * | 8/2016 | Sorrick | D6/582 | |
| 2005/0000014 A1 * | 1/2005 | Miller | A47K 3/127 | |
| | | | 4/583 | |
| 2007/0142809 A1 * | 6/2007 | Pimm | A45C 7/0059 | |
| | | | 604/385.06 | |
| 2011/0173756 A1 * | 7/2011 | Chung | A47C 27/005 | |
| | | | 5/655 | |
| 2013/0174793 A1 * | 7/2013 | Powell | A01K 13/001 | |
| | | | 119/652 | |
| 2014/0068858 A1 * | 3/2014 | Wambeke | A47G 9/062 | |
| | | | 5/420 | |
| 2014/0090175 A1 * | 4/2014 | Thrailkill | A47D 15/008 | |
| | | | 5/655 | |

* cited by examiner

INFANT TOWEL DRYING MAT

The current application claims a priority to the U.S. Provisional Patent application Ser. No. 61/988,538 filed on May 5, 2014.

FIELD OF THE INVENTION

The present invention relates generally to padded mats or rugs for bathroom floors. More specifically, the present invention is an infant towel drying mat that is intended to rest on the floor adjacent to a bathtub and make is safer and easier to dry an infant, or pet, after bathing.

BACKGROUND OF THE INVENTION

Human babies are typically born very immature, especially when compared to other terrestrial mammals. As a result of this fact, human society typically relies upon the parents of a child in order to provide basic life necessities to their offspring for many years. The amount of support which is initially required to keep an infant human alive and healthy is extensive, although the level of care and support required does gradually decrease as the child matures. The parents of infants are responsible for feeding the infant, keeping the infant clean, and almost constantly monitoring the infant to ensure that it sustains no injury. One of the most important aspects of caring for an infant is cleanliness and hygiene. It is crucial that a parent perform routine hygienic actions in order to minimize the chance of health problems with their child. Such hygienic actions typically include the provision of clean clothes, the changing of diapers, and routine bathing.

Bathing is a very important aspect of overall health and hygiene for all humans, as it helps to drastically reduce the incidence and spread of diseases. This fact stands true for humans of all ages, however in the case of infants, the bathing must be performed by a parent, as an infant is far too immature to bathe themselves. Once bathing is completed, the infant must be fully dried. The removal of all excess moisture is important, as such moisture can potentially have adverse effects on the skin, especially if it becomes trapped near the skin for long periods of time. Thus, drying is an important final step of any bathing process. Drying an infant can be a difficult and delicate process, due in large part to the fragility of a human infant's body, and the need for a parent to perform the entire process. There are several options which are available to a parent in regards to drying an infant. The parent may choose to wrap the infant in a towel and then hold the infant while drying. This method is relatively safe for the infant, however it is not very effective at actually drying the infant, and may require some skillful maneuvering of the towel in order to accomplish complete drying of the infant. The other option involves setting the baby down on a surface, either the floor or a countertop. Both the floor and the countertop of most bathrooms comprises hard tiles which can potentially be very uncomfortable or even damaging to the infant's fragile body. Additionally, this method is very inconvenient and typically requires the parent bathing the infant to prepare some towels beforehand by placing them on the floor or countertop. Both methods have their shortcomings, and there is a need for an apparatus which can drastically improve the convenience of drying an infant after bathing has been completed.

Therefore it is an object of the present invention to introduce an infant towel drying mat which allows for a towel to be mounted to it, and an infant to be safely placed on top of it. It is a further object of the present invention to be attachable to the side of a tub and to the smooth tiled floors which are commonly found in modern bathrooms. The present invention effectively provides a soft buffer between the baby and the hard floor and tub, while also conveniently holding a towel to enable drying of the infant. In usage the present invention can easily and intuitively accept a towel being mounted to it, and a baby being placed on top of it. Thus, the present invention drastically improves the convenience of drying operations performed on infant humans. The present invention can also be very useful for drying pet animals after bathing them. Thus the present invention is a versatile and useful addition to any bathroom.

DETAIL DESCRIPTIONS OF THE INVENTION

All illustrations of the drawings are for the purpose of describing selected versions of the present invention and are not intended to limit the scope of the present invention.

The present invention is an infant towel drying mat that is intended to provide a convenient and effective apparatus to aid in the drying of a human infant or a pet animal. The present invention is designed to be attached to the side of a tub and to the section of floor adjacent to the tub, such that the present invention is held securely in place directly adjacent to the tub. The primary purpose of the present invention is to provide the user with a safe area to place and dry a baby after the baby has been bathed. In reference to FIG. 1, the present invention comprises a drying mat 1 and a plurality of connection tabs 2, wherein the plurality of connection tabs 2 is utilized to attach the drying mat 1 to the tub and the section of floor adjacent to the tub.

Figure 1:
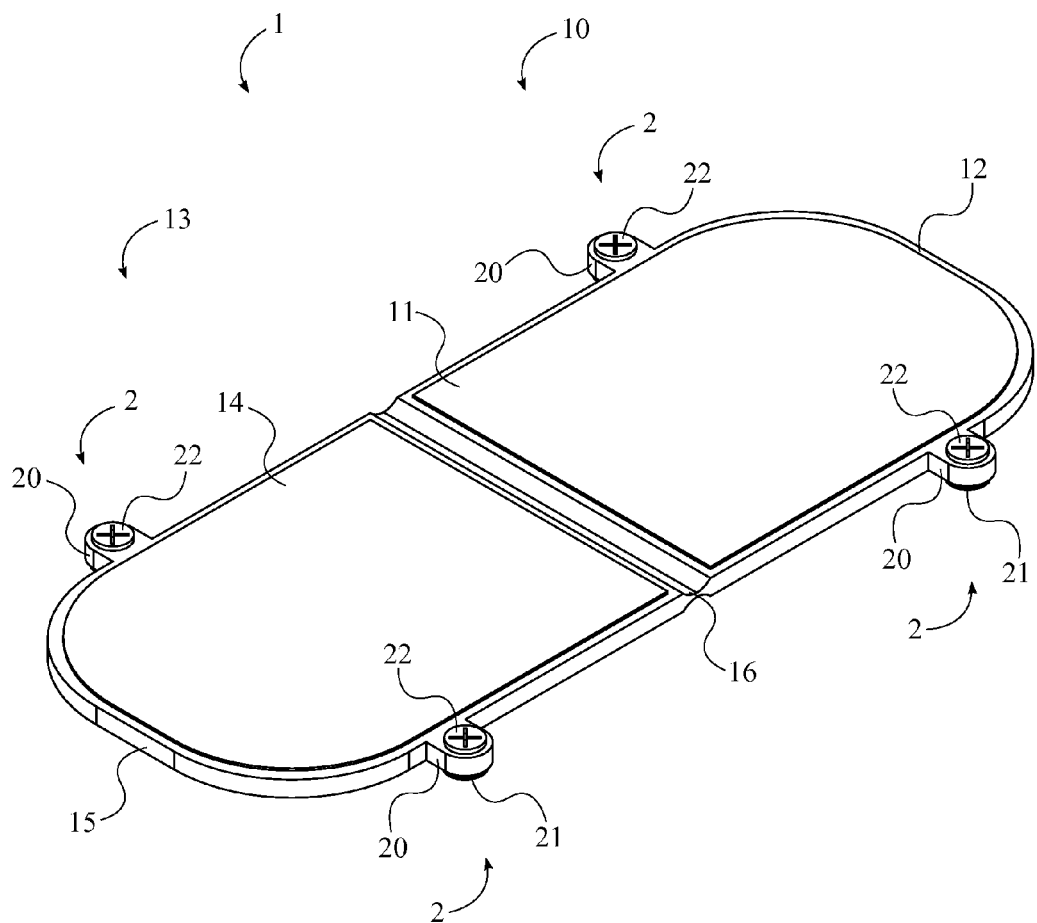
FIG. 1 is a perspective view of the present invention in a flat position.
Figure 4:
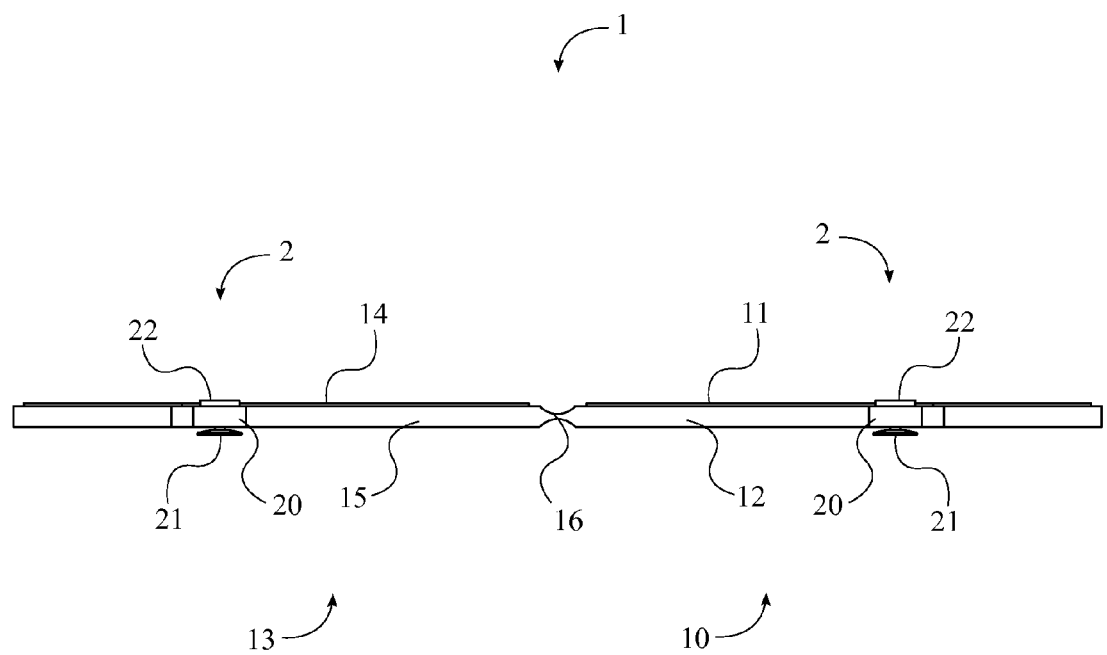
FIG. 4 is a right side elevational view of the present invention in the flat position.

In further reference to FIG. 1, the drying mat 1 provides the surface of the present invention that supports the baby and comprises a first section 10, a second section 13, and a section hinge 16. The first section 10 and the second section 13 provide a flat surface for resting the baby on, while the section hinge 16 allows the drying mat 1 to be configured in a number of different positions; namely, a flat position, a partially folded position, and a fully folded position. The section hinge 16 is adjacently connected to the first section 10 and the second section 13, wherein the section hinge 16 is positioned in between the first section 10 and the second section 13, as depicted in FIG. 4. In the preferred embodiment of the present invention, the section hinge 16 is a living hinge as the first section 10, the second section 13, and the section hinge 16 can be manufactured as a single piece. However, it is possible for the section hinge 16 to take other forms in different embodiments of the present invention.

Figure 3:
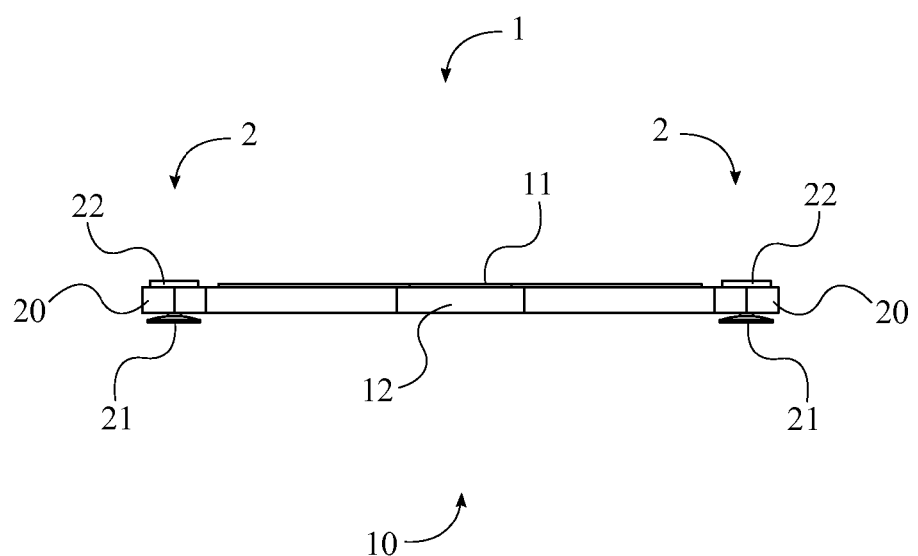
FIG. 3 is a rear elevational view of the present invention in the flat position.
Figure 5:
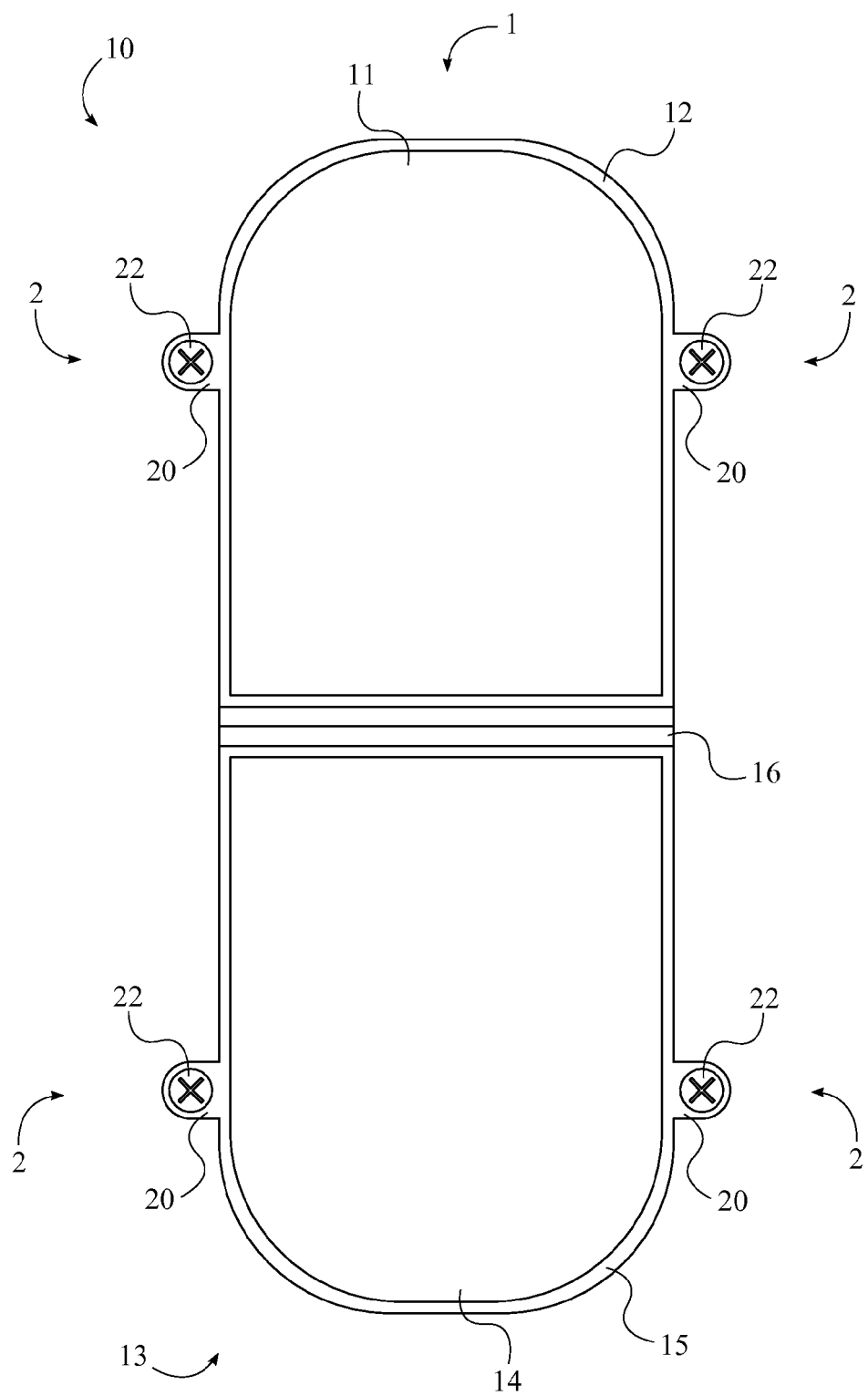
FIG. 5 is a top plan view of the present invention in the flat position.

In reference to FIG. 3 and FIG. 5, the first section 10 comprises a first padded layer 11 and a first protective shell 12. The first padded layer 11 is adjacently connected to the first protective shell 12, wherein the first padded layer 11 is perimetrically positioned within the first protective shell 12 such that the first protective shell 12 extends around the first padded layer 11. The first padded layer 11 may be positioned into the first protective shell 12 and may additionally lay flush with the first protective layer or extend above the first protective layer. The first padded layer 11 is a soft padded interior that allows the present invention to provide a soft surface on which to rest a baby or a pet, therefore preventing any discomfort or injury to the baby or pet. The first protective shell 12 is a water impermeable exterior that prevents the first padded layer 11 from being exposed to excessive moisture as the first section 10 is positioned against a wet surface.

Figure 2:
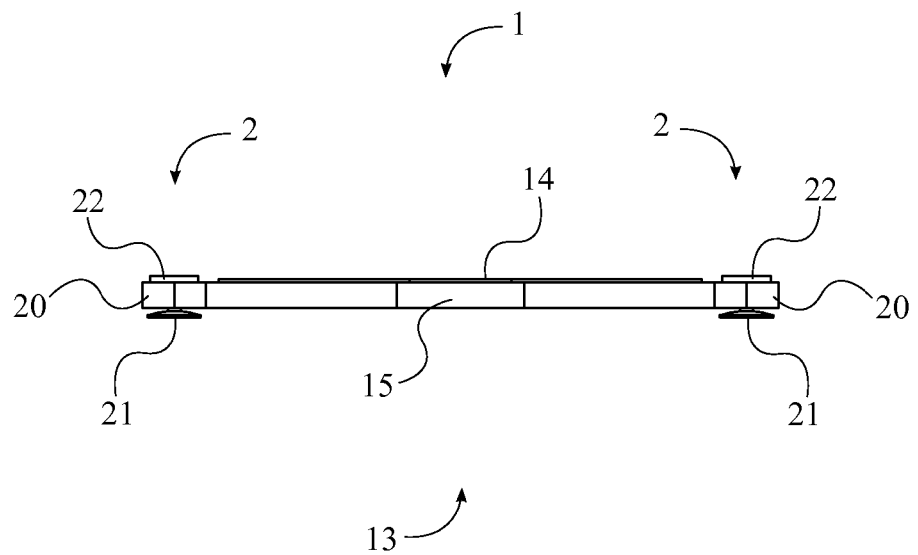
FIG. 2 is a front elevational view of the present invention in the flat position.

In reference to FIG. 2 and FIG. 5, similar to the first section 10, the second section 13 comprises a second padded layer 14 and a second protective shell 15. The second padded layer 14 is adjacently connected to the second protective shell 15, wherein the second padded layer 14 is perimetrically positioned within the second protective shell 15 such that the second protective shell 15 extends around the second padded layer 14. The second padded layer 14 may be positioned into the second protective shell 15 and may additionally lay flush with the second protective layer or extend above the second protective layer. The second padded layer 14 is a soft padded interior that allows the present invention to provide a soft surface on which to rest a baby or a pet, therefore preventing any discomfort or injury to the baby or pet. The second protective shell 15 is a water impermeable exterior that prevents the second padded layer 14 from being exposed to excessive moisture as the second section 13 is positioned against a wet surface.

Figure 6:
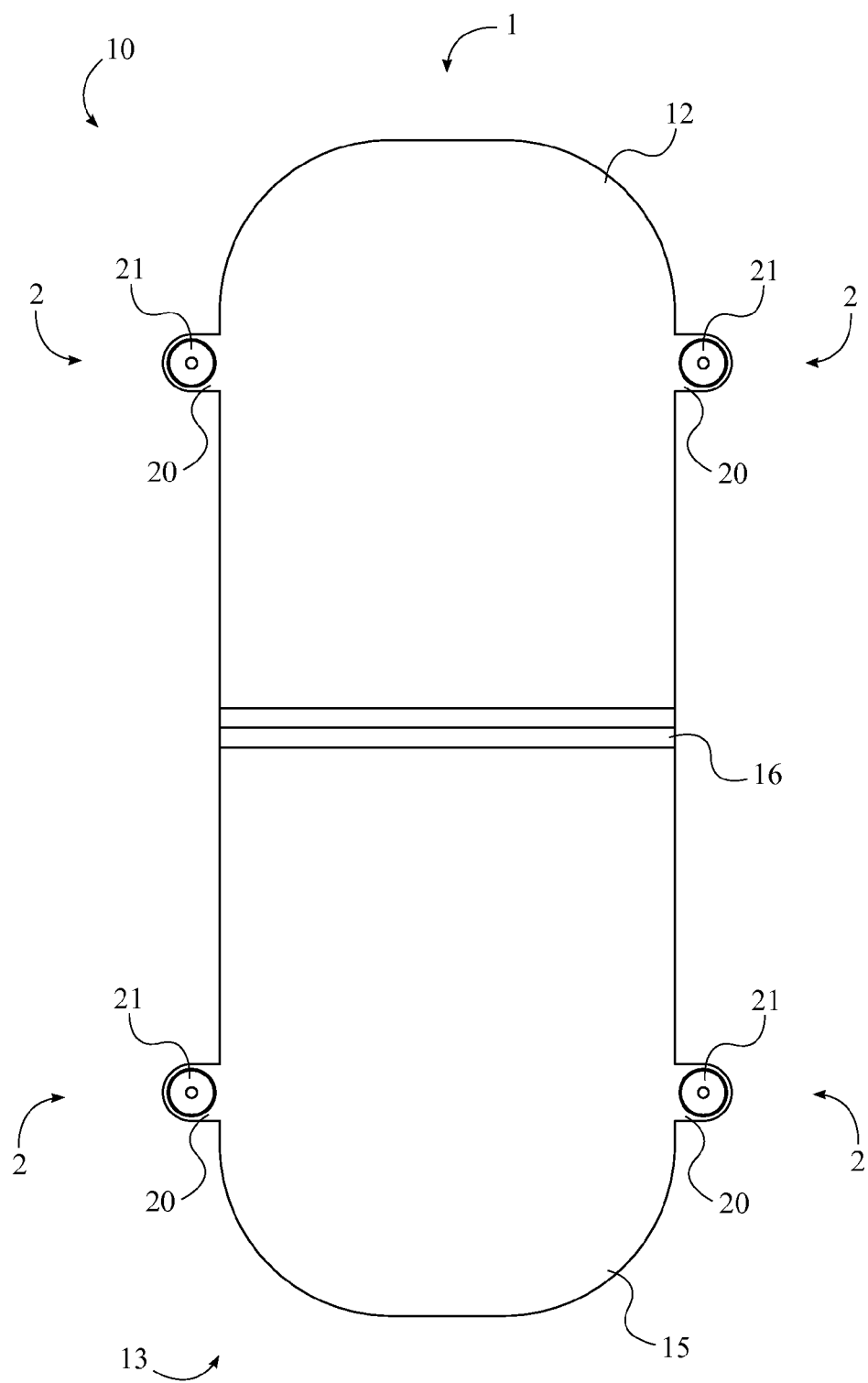
FIG. 6 is a bottom plan view of the present invention in the flat position.

In reference to FIG. 5-6, in the preferred embodiment of the present invention, the first section 10 and the second section 13 are both largely rectangular with two rounded corners. However, the exact shape of the first section 10 and the second section 13 is subject to change in other embodiments of the present invention. For example, in other embodiments of the present invention shapes may be chosen which are intended to make the present invention appear in the form of a particular animal.

In further reference to FIG. 5-6, the plurality of connection tabs 2 is adjacently connected to the drying mat 1, wherein the plurality of connection tabs 2 is perimetrically positioned about the drying mat 1. Each of the plurality of connection tabs 2 comprises a protrusion 20, a surface fastener 21, and a press towel holder 22, wherein the protrusion 20 of each of the plurality of connection tabs 2 is adjacently connected to either the first section 10 or the second section 13. More specifically, the protrusion 20 of each of the plurality of connection tabs 2 is adjacently connected to either the first protective shell 12 or the second protective shell 15. In the preferred embodiment of the present invention, two connection tabs are connected to both the first section 10 and the second section 13, however, it is possible for more or less connection tabs to be utilized in other embodiments of the present invention. For each of the plurality of connection tabs 2, the surface fastener 21 and the press towel holder 22 are adjacently connected to the protrusion 20 opposite each other, wherein the protrusion 20 provides a mounting point for the surface fastener 21 and the press towel holder 22 that extends outwards from the outer edge of the drying mat 1.

In reference to FIG. 4, for each of the plurality of connection tabs 2, the surface fastener 21 is positioned on the protrusion 20 opposite either the first padded layer 11 or the second padded layer 14. In this way, when the first section 10 and the second section 13 are attached to a surface via the surface fastener 21 of each of the plurality of connection tabs 2, the first padded layer 11 and the second padded layer 14 are directed away from the surface. In the preferred embodiment of the present invention, the surface fastener 21 is a negative pressure fastener, also known as a suction cup. The surface fastener 21 is intended to allow the present invention to be readily attached to the sidewall of the tub and the floor, both of which are typically smooth surfaces ideal for use with suction cups. However, while the surface fastener 21 being a suction cup is ideal, it is also possible for the surface fastener 21 to employ alternative fastening or adhesion methods in alternative embodiments of the present invention.

The press towel holder 22 allows a towel used for drying to be affixed to the present invention. In reference to FIG. 5, the press towel holder 22 for each of the plurality of connection tabs 2 is positioned adjacent to either the first padded layer 11 or the second padded layer 14. In this way, a towel can be positioned over top of the first padded layer 11 and the second padded layer 14, wherein the towel is positioned in between the baby or pet and both the first section 10 and the second section 13. The press towel holder 22 provides a means for temporarily, yet securely holding a towel, without causing any damage to the towel.

Figure 7:
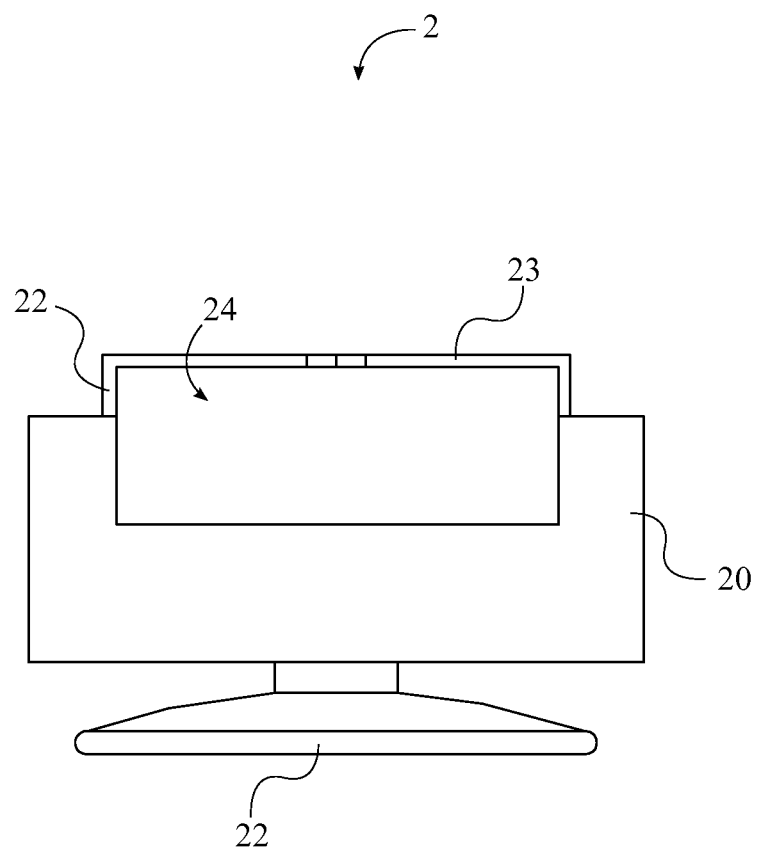
FIG. 7 is a sectional view of one of the plurality of connection tabs.

In reference to FIG. 7, in the preferred embodiment of the present invention, the press towel holder 22 is a tea towel holder, wherein the press towel holder 22 comprises a deformable perforated membrane 23 and a receiving volume 24. The receiving volume 24 is internally positioned within the press towel holder 22 and may optionally be positioned into the protrusion 20, while the deformable perforated membrane 23 is positioned adjacent to the receiving volume 24. The deformable perforated membrane 23 is flexible and has an opening such that a towel can be pushed through the deformable perforated membrane 23 and into the receiving volume 24. Sufficient force is then required in order to free the towel from the receiving volume 24 through the deformable perforated membrane 23. In alternative embodiments of the present invention it is also possible for the press towel holder 22 to provide different means for temporarily mounting a towel.

In reference to FIG. 1 and FIG. 4, the flat position, the first section 10 and the second section 13 are parallel to each other and coplanar, wherein the drying mat 1 can be laid across a flat surface such as a floor, countertop or table. The drying mat 1 is positioned on the flat surface, wherein the first protective shell 12 and the second protective shell 15 are in contact with the flat surface and the first padded layer 11 and the second padded layer 14 are positioned away from the flat surface. In this way, the surface fastener 21 of each of the plurality of connection tabs 2 is in contact with the flat surface to secure the present invention to the flat surface. A towel can then be positioned across the present invention and secured in place by the press towel holder 22 of each of the plurality of connection tabs 2.

Figure 8:
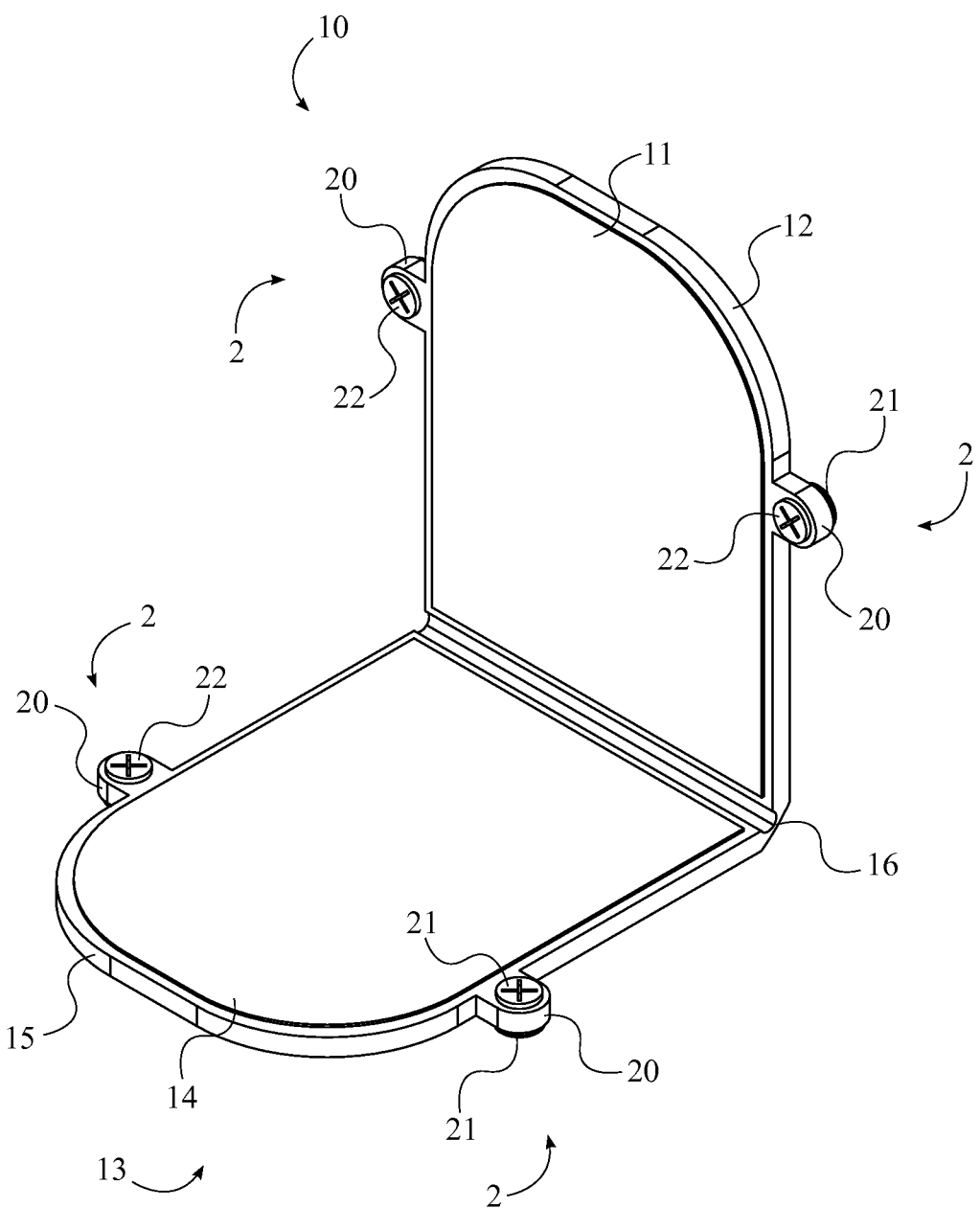
FIG. 8 is a perspective view of the present invention in a partially folded position.
Figure 9:
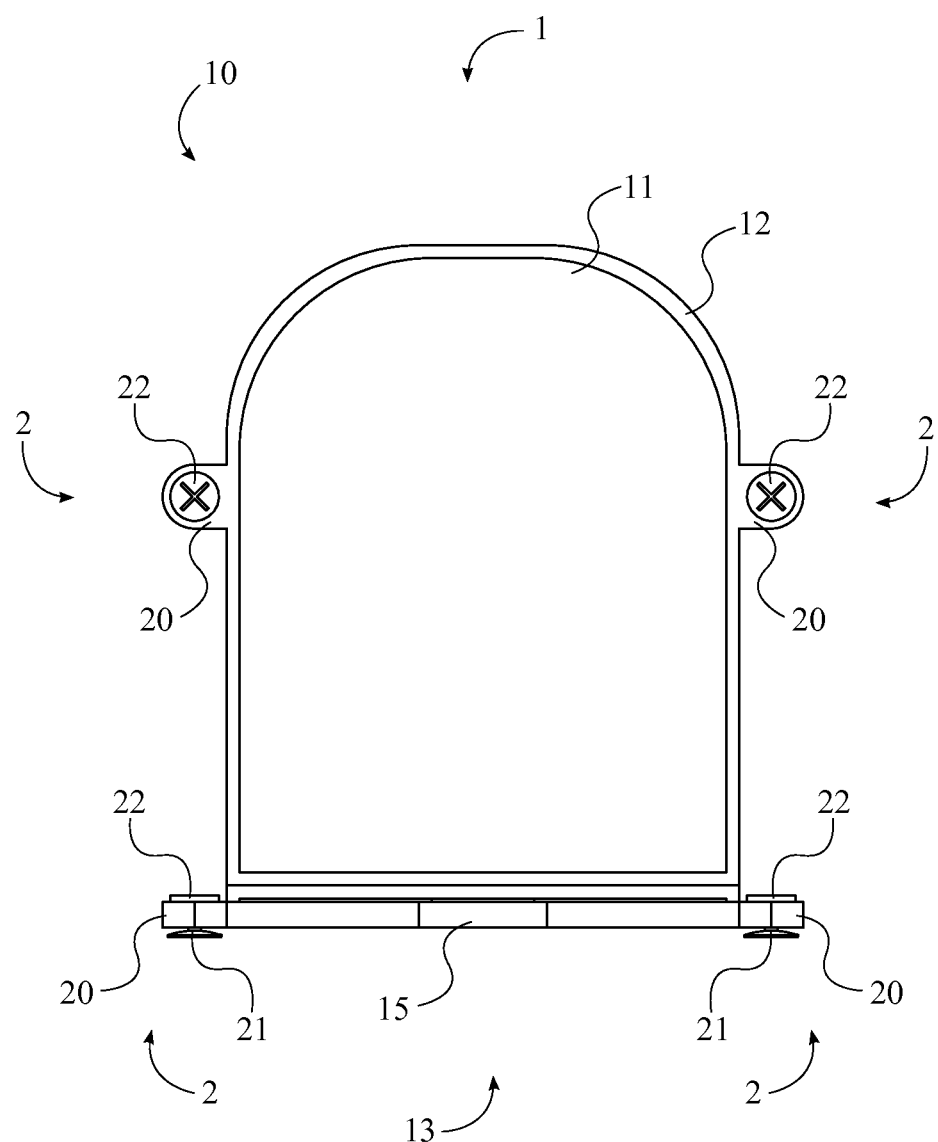
FIG. 9 is a front elevational view of the present invention in the partially folded position.
Figure 10:
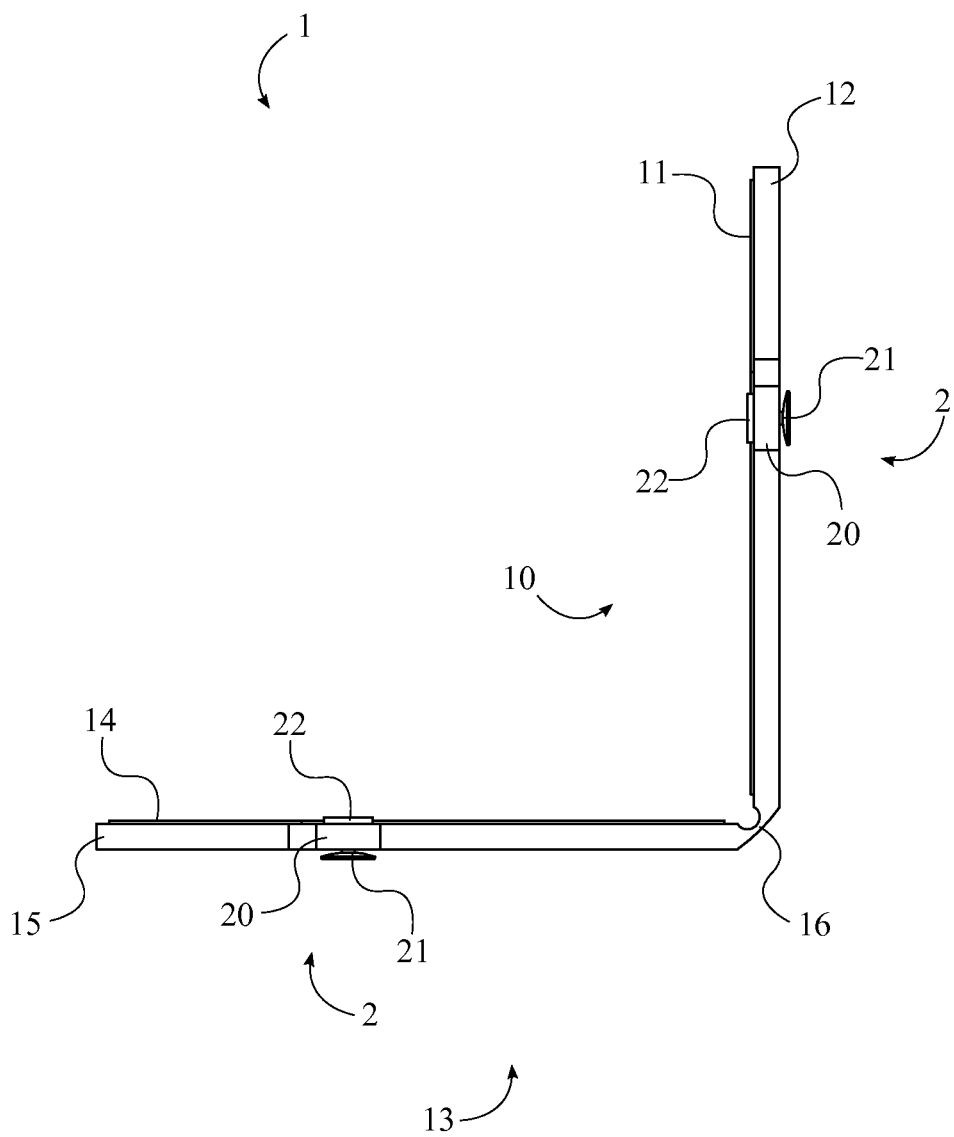
FIG. 10 is a right side elevational view of the present invention in the partially folded position.
Figure 11:
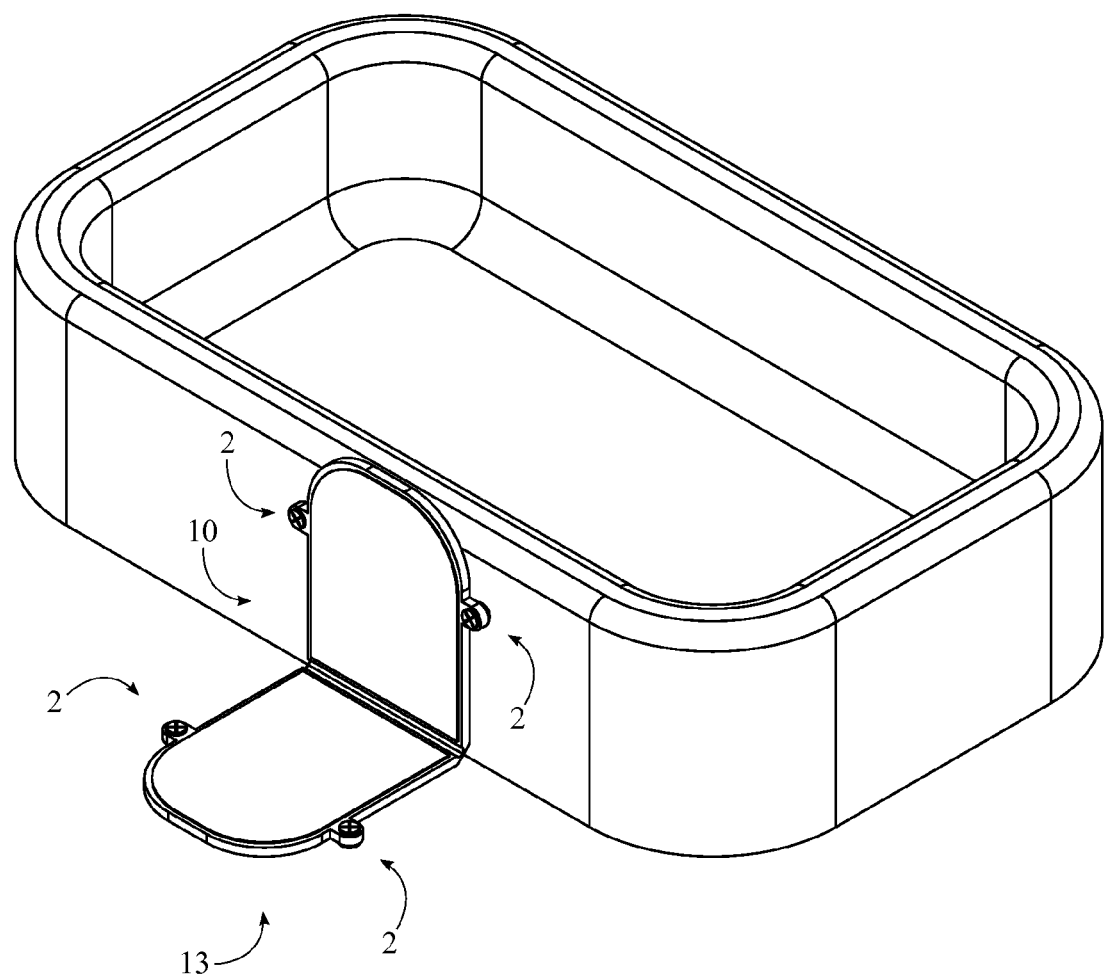
FIG. 11 is a perspective view of the present invention attached to a tub and a floor in the partially folded position.
Figure 12:
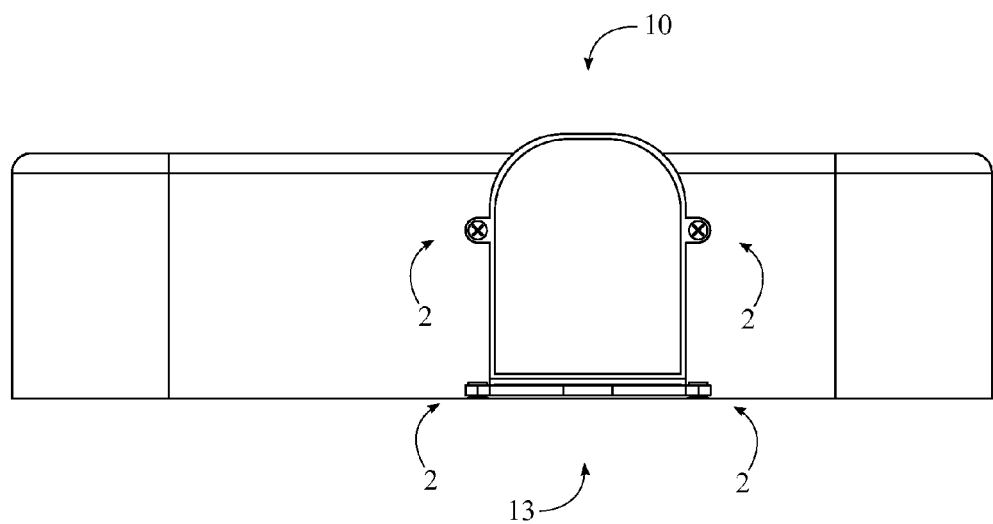
FIG. 12 is a front elevational view of the present invention attached to the tub and the floor in the partially folded position.

In reference to FIG. 8-10, in the partially folded position, the first section 10 and the second section 13 are positioned perpendicular to each other, wherein the first section 10 can be positioned adjacent and parallel to the side of the tub and the second section 13 can be positioned adjacent and parallel to the floor, or vice versa. In reference to FIG. 11-12, the first padded layer 11 and the second padded layer 14 are positioned away from the side of the tub and the floor, wherein the surface fastener 21 of each of the plurality of connection tabs 2 is attached to either the tub or the floor. A towel can then be draped from the first section 10 to the second section 13 using the press towel holder 22 of each of the plurality of connection tabs 2. The section hinge 16 also allows the first section 10 and the second section 13 to be positioned in between the flat position and the partially folded position for use on irregular surfaces or in other various situations.

Figure 13:
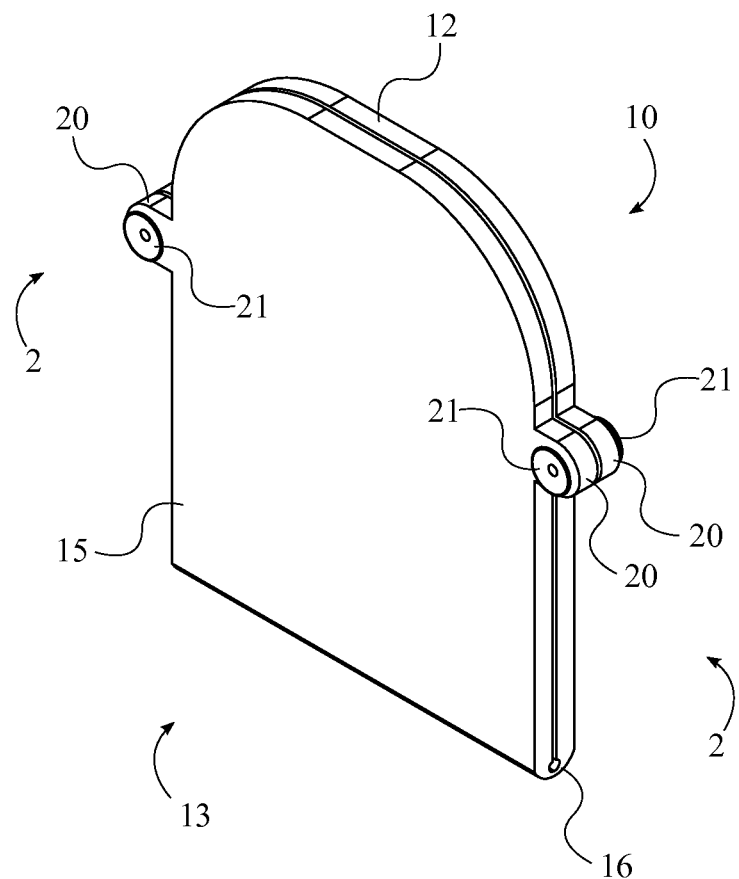
FIG. 13 is a perspective view of the present invention in a fully folded position.
Figure 14:
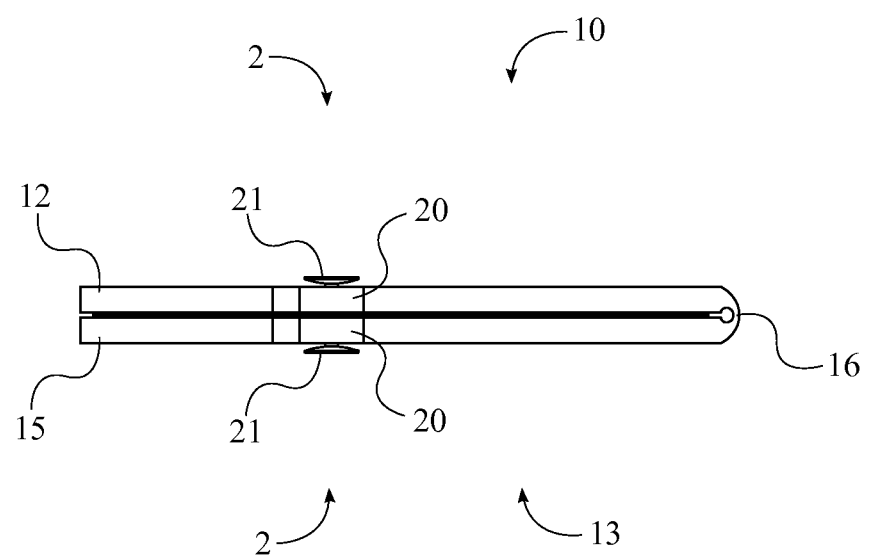
FIG. 14 is a right side elevational view of the present invention in the fully folded position.

In reference to FIG. 13-14, the fully folded position provides a means for storing and transporting the present invention, wherein the first section 10 and the second section 13 are parallel to each other but not coplanar. The first section 10 and the second section 13 are stacked, wherein the first padded layer 11 is flush with the second padded layer 14. This allows the present invention to be more readily stored and transported, as the length of the present invention in the fully folded position is half of the length of the present invention in the flat position. A locking mechanism may further be included in some embodiments of the present invention in order to secure the present invention in the fully folded position, such that the first section 10 and the second section 13 are not accidentally deployed from each other.

Figure 15:
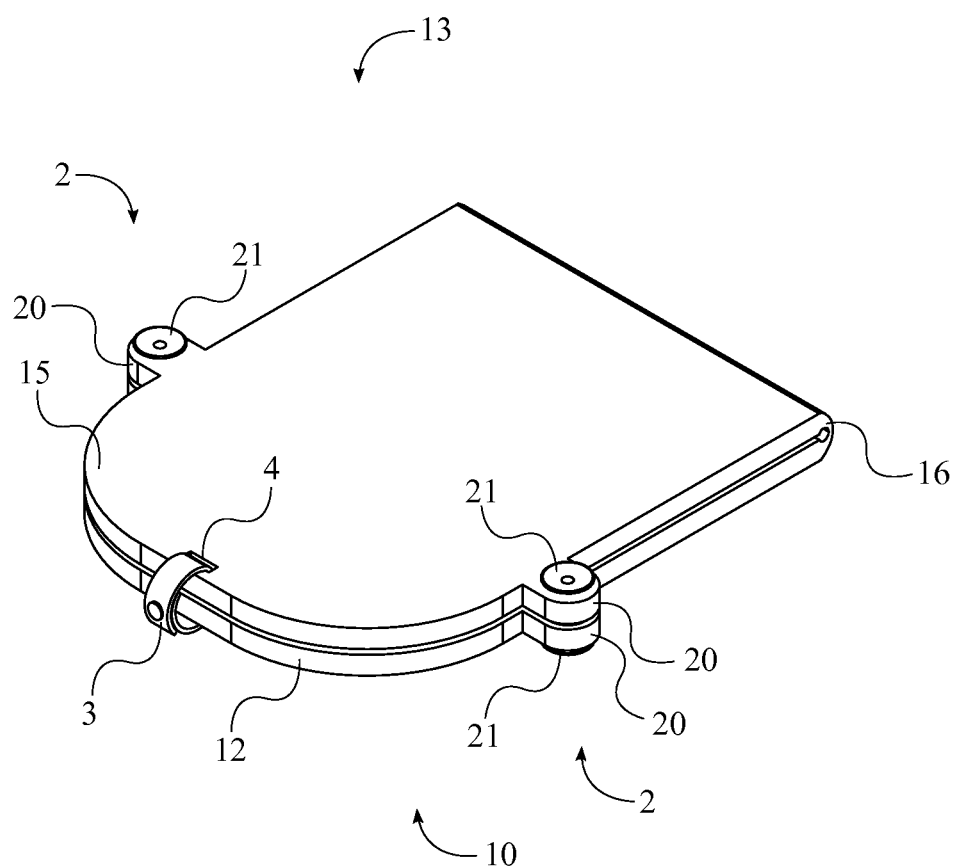
FIG. 15 is a perspective view of the present invention having a fastening strap.
Figure 16:
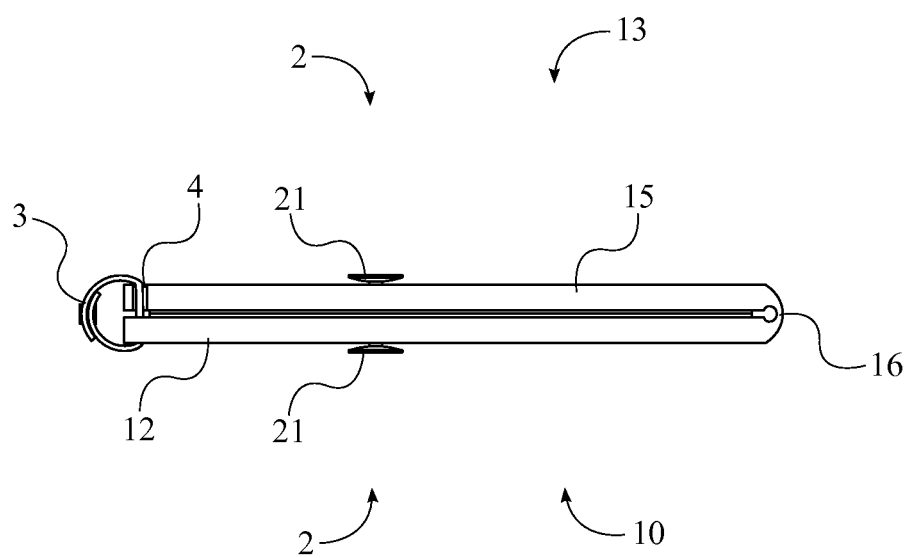
FIG. 16 is a right side elevational view thereof.

In reference to FIG. 15-16, in some embodiments, the present invention further comprises a fastening strap 3 and a fastening hole 4. The fastening strap 3 is adjacently connected to the first section 10, while the fastening hole 4 traverses through the second section 13, or vice versa. The fastening strap 3 comprises a first strap section and a second strap section being connected opposite each other about the first section 10. The first strap section comprises a first fastener positioned opposite the first section 10 along the first strap section, while the second strap section comprises a second fastener positioned opposite the first section 10 along the second strap section. Ideally, the first fastener and the second fastener are opposing snap fasteners, however, the first fastener and the second fastener can also be hook and loop fasteners or any other suitable type of fastener used to secure the first section 10 and the second section 13 in the fully folded position.

When the present invention is in the fully folded position, either the first strap section or the second strap section, depending on the orientation, is positioned through the fastening hole 4. The first fastener then engages the second fastener, wherein the first strap section is attached to the second strap section in order to secure the first section 10 and the second section 13 closed in the fully folded position. In addition to being used to secure the present invention in the fully folded position, the fastening strap 3 or the fastening hole 4 can be utilized for alternative functions, such as attaching a leash to the present invention when in the partially folded position or the flat position. This can be useful, as the present invention may be utilized for drying pets and the ability to secure a leash to the present invention can be used to prevent a pet from running away while being dried.

In other embodiments of the present invention, the fastening strap 3 is a single strap section. The fastening strap 3 is adjacently connected to the first section 10 and the fastening hole 4 traverse through the second section 13. The first fastener is positioned on the fastening strap 3 opposite the first section 10, while the second fastener is positioned on the first section 10 opposite the fastening strap 3. In this way, the fastening strap 3 traverses through the fastening hole 4, wherein the first fastener on the fastening strap 3 then engages the second fastener on the first section 10, securing the present invention in the fully folded position. It is also possible for the fastening strap 3 to be connected to the second section 13, wherein the second fastener is positioned on the second section 13 opposite the fastening strap 3, and wherein the fastening hole 4 traverses through the first section 10.

Although the invention has been explained in relation to its preferred embodiment, it is to be understood that many other possible modifications and variations can be made without departing from the spirit and scope of the invention as hereinafter claimed.

What is claimed is:

1. An infant towel drying mat comprises:
   a drying mat;
   a plurality of connection tabs;
   the drying mat comprises a first section, a second section, and a section hinge;
   each of the plurality of connection tabs comprises a protrusion, a surface fastener, and a press towel holder;
   the section hinge being adjacently connected to both the first section and the second section;
   the section hinge being positioned in between the first section and the second section;
   the plurality of connection tabs being adjacently connected to the drying mat;
   the plurality of connection tabs being perimetrically positioned about the drying mat; and
   the surface fastener and the press towel holder being adjacently connected to the protrusion opposite each other.

2. The infant towel drying mat as claimed in claim 1 comprises:
   the protrusion being adjacently connected to the first section.

3. The infant towel drying mat as claimed in claim 1 comprises:
   the protrusion being adjacently connected to the second section.

4. The infant towel drying mat as claimed in claim 1 comprises:
   the first section comprises a first padded layer and a first protective shell;
   the first padded layer being adjacently connected to the first protective shell; and
   the first padded layer being perimetrically positioned within the first protective shell.

5. The infant towel drying mat as claimed in claim 4 comprises:
   the protrusion being adjacently connected to the first protective shell; and the surface fastener being positioned on the protrusion opposite the first padded layer.

6. The infant towel drying mat as claimed in claim 1 comprises:
the second section comprises a second padded layer and a second protective shell;
the second padded layer being adjacently connected to the second protective shell; and
the second padded layer being perimetrically positioned within the second protective shell.

7. The infant towel drying mat as claimed in claim 6 comprises:
the protrusion being adjacently connected to the second protective shell; and
the surface fastener being positioned on the protrusion opposite the second padded layer.

8. The infant towel drying mat as claimed in claim 1 comprises:
the press towel holder comprises a deformable perforated membrane and a receiving volume;
the receiving volume being internally positioned; and
the deformable perforated membrane being positioned adjacent to the receiving volume.

9. The infant towel drying mat as claimed in claim 8 comprises:
the receiving volume traversing into the protrusion.

10. The infant towel drying mat as claimed in claim 1 comprises:
a fastening strap;
a fastening hole;
the fastening strap being adjacently connected to the first section; and
the fastening hole traversing through the second section.

11. An infant towel drying mat comprises:
a drying mat;
a plurality of connection tabs;
the drying mat comprises a first section, a second section, and a section hinge;
each of the plurality of connection tabs comprises a protrusion, a surface fastener, and a press towel holder;
the section hinge being adjacently connected to both the first section and the second section;
the section hinge being positioned in between the first section and the second section;
the plurality of connection tabs being adjacently connected to both the first section and the second section, wherein the protrusion for each of the plurality of connection tabs is adjacently connected to either the first section or the second section;
the plurality of connection tabs being perimetrically positioned about the drying mat; and
the surface fastener and the press towel holder being adjacently connected to the protrusion opposite each other.

12. The infant towel drying mat as claimed in claim 11 comprises:
the first section comprises a first padded layer and a first protective shell;
the first padded layer being adjacently connected to the first protective shell; and
the first padded layer being perimetrically positioned within the first protective shell.

13. The infant towel drying mat as claimed in claim 12 comprises:
the protrusion being adjacently connected to the first protective shell; and
the surface fastener being positioned on the protrusion opposite the first padded layer.

14. The infant towel drying mat as claimed in claim 11 comprises:
the second section comprises a second padded layer and a second protective shell;
the second padded layer being adjacently connected to the second protective shell; and
the second padded layer being perimetrically positioned within the second protective shell.

15. The infant towel drying mat as claimed in claim 14 comprises:
the protrusion being adjacently connected to the second protective shell; and
the surface fastener being positioned on the protrusion opposite the second padded layer.

16. The infant towel drying mat as claimed in claim 11 comprises:
the press towel holder comprises a deformable perforated membrane and a receiving volume;
the receiving volume being internally positioned; and
the deformable perforated membrane being positioned adjacent to the receiving volume.

17. The infant towel drying mat as claimed in claim 16 comprises:
the receiving volume traversing into the protrusion.

18. The infant towel drying mat as claimed in claim 11 comprises:
a fastening strap;
a fastening hole;
the fastening strap being adjacently connected to the first section; and
the fastening hole traversing through the second section.

19. An infant towel drying mat comprises:
a drying mat;
a plurality of connection tabs;
the drying mat comprises a first section, a second section, and a section hinge;
each of the plurality of connection tabs comprises a protrusion, a surface fastener, and a press towel holder;
the first section comprises a first padded layer and a first protective shell;
the second section comprises a second padded layer and a second protective shell;
the press towel holder comprises a deformable perforated membrane and a receiving volume;
the section hinge being adjacently connected to both the first section and the second section;
the section hinge being positioned in between the first section and the second section;
the first padded layer being adjacently connected to the first protective shell;
the first padded layer being perimetrically positioned within the first protective shell;
the second padded layer being adjacently connected to the second protective shell;
the second padded layer being perimetrically positioned within the second protective shell;
the plurality of connection tabs being adjacently connected to both the first protective shell and the second protective shell, wherein the protrusion for each of the plurality of connection tabs is adjacently connected to either the first protective shell or the second protective shell;
the plurality of connection tabs being perimetrically positioned about the drying mat;

the surface fastener and the press towel holder being adjacently connected to the protrusion opposite each other;

the surface fastener being positioned on the protrusion opposite the first padded layer and the second padded layer;

the receiving volume being internally positioned; and the deformable perforated membrane being positioned adjacent to the receiving volume.

20. The infant towel drying mat as claimed in claim 19 comprises:

a fastening strap;

a fastening hole;

the fastening strap being adjacently connected to the first section; and the fastening hole traversing through the second section.

\* \* \* \* \*